Patented Apr. 17, 1923.

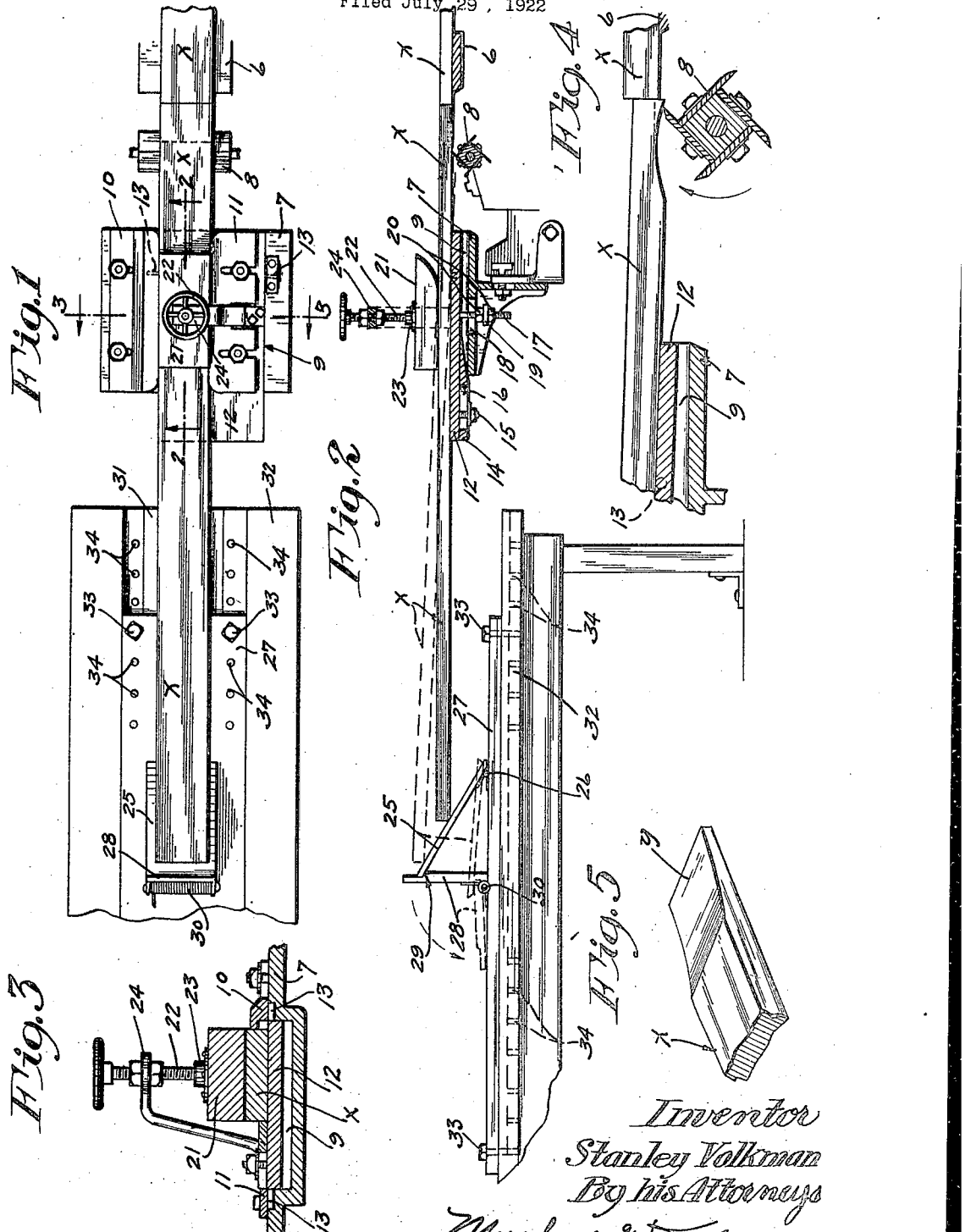

1,452,008

UNITED STATES PATENT OFFICE.

STANLEY VOLKMAN, OF MINNEAPOLIS, MINNESOTA.

ATTACHMENT FOR WOODWORKING MACHINES.

Application filed July 29, 1922. Serial No. 578,455.

*To all whom it may concern:*

Be it known that I, STANLEY VOLKMAN, citizen of the United States, residing at Minneapolis, in the county of Hennepin and State of Minnesota, have invented certain new and useful Improvements in Attachments for Woodworking Machines; and I do hereby declare the following to be a full, clear, and exact description of the invention, such as will enable others skilled in the art to which it appertains to make and use the same.

My invention relates to improvements in wood-working machines, and more particularly to four-sided molders; and has for its object to provide an attachment therefor, whereby materials passing therethrough may be automatically fed to one of the cutters to further finish the same.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary plan view of a four-sided molder having the attachment applied thereto;

Fig. 2 is a view partly in side section and partly in longitudinal central section taken on the line 2—2 of Fig. 1;

Fig. 3 is a view principally in transverse section taken on the line 3—3 of Fig. 1;

Fig. 4 is a detail view partly in longitudinal section and partly in side elevation showing the material, as illustrated in broken lines in Fig. 2, said view being on an enlarged scale; and Fig. 5 is a fragmentary perspective view of the finished product.

Of the parts of the four-sided molder illustrated, it is important to note the frame bed 6, vertically adjustable table 7 and lower cutter head 8 which is mounted in a gap between said bed and table. It may be here stated that in such machines materials fed thereto first pass under an upper cutter head, then between two horizontally spaced opposing cutter heads, and finally over the cutter head 8.

The table 7 is provided with a channel 9 which extends in the direction of the movement of material through the molder. A pair of co-operating guides 10 and 11 are secured to the table 7, one on each side of the channel 9 for adjustment toward and from each other.

For certain kinds of work, materials finished on four sides by a commercial molder require one of their ends to be cut on a bevel, and to do this it is necessary after removing the material from the molder to carry the same to a saw and cut one end thereof on a bevel. To eliminate this extra work and thus save considerable time and expense, I provide an attachment for woodworking machines which automatically tilts materials passing therethrough, just before the rear ends thereof are finished by the lower cutter head 8, and feeds the same to said cutter head to bevel one end thereof, as shown in Fig. 5.

The attachment includes a supplemental table 12 mounted in the channel 9 and having on its longitudinal edges a pair of aligned trunnions 13 mounted in open seats in the table 7 at the sides of the channel 9 and held in position by the guides 10 and 11. These trunnions 13 are located rearward of the longitudinal edges of the table 12 and permit adjustment thereof from a position in which said table is in the same plane as the upper surface of the bed 6 to positions which extend at various different angles thereto. As the outer end of the supplemental table 12 is much heavier than the inner end thereof, said table will return to normal position under the action of gravity.

An adjustable stop 14 in the form of a horizontally disposed wedge is secured to the under side of the supplemental table 12 by a nut-equipped stud 15, for engagement with the outer edge of the bottom of the channel 9. The nut-equipped stud 15 is anchored to the supplemental table 12 and extends through a longitudinal slot 16 in the stop 14, which bolt and slot permit adjustment of the stop 14 longitudinally into and out of the channel 9, as best shown in Fig. 2.

To limit the lifting movement of the outer end of the supplemental table 12 there is secured thereto a depending screw-threaded stud 17 which extends through a longitudinal slot 18 in the bottom of the channel 9. On the stud 17 is a stop collar 19 held in different adjustments by opposing nuts 20 for engagement with the under side of said channel. For holding the work onto the supplemental table 12, there is provided a vertically adjustable pressure shoe 21 which overlies said table between the guides 10 and 11 which is provided with a curved inner end which directs the work thereunder during its feeding movement from the cutter head 8. This pressure shoe 21 is adjustably held suspended by an upright handpiece-equipped screw 22, the lower end of which is swivelled at 23 to said shoe and has screw-threaded engagement with a bracket 24. Said bracket 24 is rigidly secured to the supplemental table 12 at the guide 11 which is cut away to afford clearance for said bracket.

As illustrated in the drawings, slats $x$ are being fed through the molder and their under surfaces finished by the cutter head 8. These slats $x$ are moving through the machine in endwise arrangement and the one pushes the other. Just before each slat $x$ is finished by the cutter head 8 the same is tilted to feed its rear end portion to the cutter head 8 and thereby cut a bevel $y$ thereon, as best shown in Fig. 5.

To tilt the slats $x$ and thereby lift their outer ends and depress their rear ends onto the cutter head 8, I provide an inclined abutment 25 hinged at 26 to a table top section 27. The outer or free end of the abutment 25 is normally and releasably held raised by an upright trip 28 having near its upper end a shoulder 29 on which said abutment rests. This trip 28 is secured at its lower end to the table top section 27 by a spring hinge 30 which permits said trip to be moved onto the table top section 27, as indicated by broken lines in Fig. 2.

When the outer end of one of the slats $x$ engages the abutment 25, the same travels upward thereon, and as the slat $x$ is held by the pressure shoe 21 on the table 12, swinging movement is imparted to the table 12 and thereby feeds the rear end of the respective slat $x$ to the cutter head 8. At the completion of the cutting of the bevel $y$, the outer end of the slat $x$ engages the trip 28 and moves the same to carry its shoulder 29 from under the abutment 25 and thereby trips said abutment and allows the same to collapse, as indicated by broken lines in Fig. 2, thus permitting the slat $x$ to pass thereover. As soon as a finished slat $x$ has been removed by an attendant, the spring hinge 30 again raises the trip 28 and thereby automatically resets the abutment 25.

The table top section 27 is mounted in a longitudinal channel 31 in the top of a table 32 for adjustment toward and from the cutter head 8. Bolts 33 are inserted through aligned bores 34 in the table top section 27 and bottom of the channel 31 to hold said table top section in different adjustments toward and from said cutter head.

From the above description it is evident that the guides 10 and 11 and the pressure shoe 21 may be adjusted for slats of different widths and thicknesses and that the trip 28 may be set different distances from the cutter head 8 for slats of different lengths. At the time the outer ends of the slats $x$ engage the trip 28, the stop collar 19 engages the under side of the channel 9 to prevent further upward movement of the outer end of the table 12.

The above described attachment has been put into successful commercial use and proven highly efficient for the purpose had in view. It is evident that no additional work or time is required in cutting a bevel on a slat by means of the attachment during its travel in the wood-working machine.

The term slat is herein used in a broad sense to cover various different kinds of material.

What I claim is:

1. The combination with a cutter head, of a tilting table, and means arranged to be engaged by the work on the table to tilt the same and thereby feed a greater portion of the work to the cutter head and which means is thereafter rendered inoperative by the work in a predetermined position thereof.

2. The structure defined in claim 1 in which the means for tilting the work is automatically returned to normal position.

3. The structure defined in claim 1 in which the table may be supported in different inclinations when normal.

4. The combination with a cutter head, of a tilting table, and means arranged to be engaged by the work on the table to tilt the same and thereby feed a greater portion of the work to the cutter head.

5. The structure defined in claim 4 in further combination with an adjustable shoe for holding the work on the table.

6. The structure defined in claim 4 in further combination with a stop for limiting the tilting movement of the table.

7. The structure defined in claim 4 in which the tilting table is automatically returned to normal position.

8. The structure defined in claim 7 in further combination with an adjustable stop for positioning the table in normal position.

9. The combination with a cutter head, of means for holding work on the table, and an abutment arranged to be engaged by the work during its movement on the table to tilt said table and feed a greater portion of the work to the cutter head.

10. The structure defined in claim 9 in further combination with a trip arranged to render the abutment inoperative in a predetermined position of the work.

11. The structure defined in claim 9 in further combination with a trip arranged to be engaged by the work to render the abutment inoperative.

12. The structure defined in claim 11 in further combination with automatic means for returning the trip and abutment to normal position.

13. The structure defined in claim 9 in which the abutment is adjustable in respect to the cutter head.

14. The structure defined in claim 9 in which the abutment is adjustable toward and from the cutter head.

In testimony whereof I affix my signature.

STANLEY VOLKMAN.